S. G. WILKES.
CHILD'S SPOON, FORK, OR SIMILAR ARTICLE.
APPLICATION FILED APR. 26, 1916.
1,189,897. Patented July 4, 1916.
Fig. I.
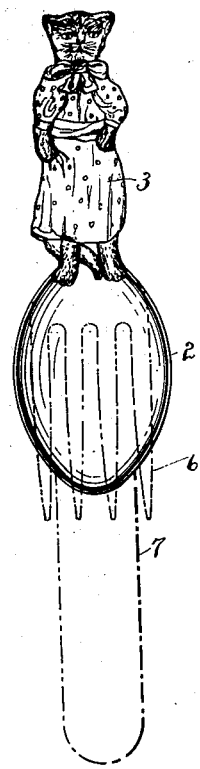
Fig. II.
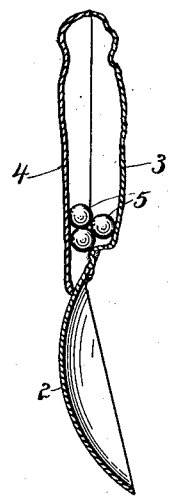
Inventor
Samuel G. Wilkes
Seymour Earle
Atty.

UNITED STATES PATENT OFFICE.

SAMUEL G. WILKES, OF WALLINGFORD, CONNECTICUT, ASSIGNOR TO R. WALLACE & SONS MFG. CO., OF WALLINGFORD, CONNECTICUT, A CORPORATION.

CHILD'S SPOON, FORK, OR SIMILAR ARTICLE.

1,189,897. Specification of Letters Patent. Patented July 4, 1916.

Application filed April 26, 1916. Serial No. 93,594.

*To all whom it may concern:*

Be it known that I, SAMUEL G. WILKES, a citizen of the United States, residing at Wallingford, in the county of New Haven and State of Connecticut, have invented a new and useful Improvement in a Child's Spoon, Fork, or Similar Article; and I do hereby declare the following, when taken in connection with the accompanying drawings, and the characters of reference marked thereon, to be a full, clear, and exact description of the same, and which said drawings constitute part of this application, and represent, in—

Figure 1 a face view of a hollow handle rattle, spoon, fork or knife constructed in accordance with my invention. Fig. 2 a view in vertical section.

This invention relates to an improvement in spoons, forks or similar articles particularly adapted for children, the object being to form the handle as a rattle by providing it with a chamber in which small pieces of hard material may be placed as strikers to produce a rattle; and the invention consists in the construction hereinafter described and particularly recited in the claims.

In carrying out my invention, I provide the bowl 2 of the spoon with a hollow handle. This handle may be of any preferred design, and will preferably consist of a faceplate 3 formed integral with the bowl 2 of the spoon, and a back 4, the front and back being readily struck up from metal, celluloid, rubber or other material from which children's spoons may be formed, and united at their edges in the usual manner of forming hollow handles. Within the chamber formed between the front plate 3 and back plate 4, strikers 5 will be placed, these strikers being formed from metal, pebbles, or other suitable substances which when the device is shaken, will produce a rattling noise. It is obvious, as indicated in broken lines in Fig. 1, that instead of a spoon, the handle may be applied to a fork 6 or knife blade 7, and it will be understood that it may be applied to any other device of a similar character. It will also be apparent, without further illustration, that instead of forming the front plate 3 integral with the bowl or tines, that both members of the handle might be formed separately and secured to the bowl or tines in any of the well known methods of attaching handles to spoons, forks and similar articles.

I claim:—

1. A spoon, fork or similar article formed with a handle having a chamber, and a striker located in said chamber free to move therein.

2. A spoon, fork or similar article having a handle, the front plate of which is formed integral with the spoon or fork, a back plate attached to the front plate and forming a chamber between them, and a striker located in said chamber.

SAMUEL G. WILKES.